United States Patent
Ahmed et al.

(10) Patent No.: US 10,637,243 B1
(45) Date of Patent: Apr. 28, 2020

(54) DYNAMIC DIRECT POWER CONTROL METHOD AND SYSTEM FOR A GRID CONNECTED CONVERTER

(71) Applicant: Emirates Steel Industries PJSC, Abu Dhabi (AE)

(72) Inventors: Hany Abdelmonem Hamed Ahmed, Abu Dhabi (AE); Ahmed Fathi Ahmed Abdou, Ngunnawal (AU); Elwy Eissa Ahmed Elkholy, Shebeen El-Kom (EG); Mohammed Shawki Moursi, Abu Dhabi (AE); Samrat Sumsher Acharya, Jersey City, NJ (US)

(73) Assignee: Emirates Steel Industries PJSC, Musaffah, Abu Dhabi (AE)

( * ) Notice: Subject to any disclaimer, the term of this patent is extended or adjusted under 35 U.S.C. 154(b) by 0 days.

(21) Appl. No.: 16/251,906

(22) Filed: Jan. 18, 2019

(51) Int. Cl.
*H02J 3/18* (2006.01)
*H02M 7/539* (2006.01)
*H02J 3/01* (2006.01)

(52) U.S. Cl.
CPC ........ *H02J 3/18* (2013.01); *H02J 3/01* (2013.01); *H02M 7/539* (2013.01)

(58) Field of Classification Search
CPC ............... H02J 3/18; H02J 3/01; H02M 7/539
See application file for complete search history.

(56) References Cited

U.S. PATENT DOCUMENTS

| | | | | |
|---|---|---|---|---|
| 2014/0050000 A1* | 2/2014 | Teo | ...................... | H02M 7/487 363/131 |
| 2014/0334206 A1* | 11/2014 | Valiani | .................. | H02M 7/487 363/97 |
| 2015/0194902 A1* | 7/2015 | Tian | ...................... | H02M 5/458 363/37 |
| 2015/0236615 A1* | 8/2015 | Xue | ...................... | H02M 7/537 363/97 |
| 2017/0279370 A1* | 9/2017 | Zhao | .................... | H02M 5/297 |

* cited by examiner

*Primary Examiner* — Emily P Pham
(74) *Attorney, Agent, or Firm* — Sughrue Mion, PLLC (57) ABSTRACT

A method and system of controlling a power converter operatively coupled with an electric grid, includes: operating the power converter in a direct power control mode with a dynamic switching table, the dynamic switching table including a group of converter space vectors and switching rules associated with the grid voltage and the dc-link voltage of the power converter; detecting abnormalities in the grid voltage and/or the converter dc-link voltage due to a grid fault event relative to their nominal operating conditions; determining a group of crossover angles for a group of converter vectors including the nearest three vectors to a grid voltage vector location inside a hexagonal space vector diagram; dynamically selecting a proper vector based on algorithmic feedforward of the group of crossover angles to dynamically construct the dynamic switching table; and controlling an output power of the power converter.

15 Claims, 8 Drawing Sheets

Positive Power

| P/Q | $u_k$ | P/Q | $u_k$ |
|---|---|---|---|
| +/+ | $u_{s+1}$ | ++/+ | $u_{s+3}$ |
| +/++ | $u_{m+2}$ | ++/++ | $u_{s+3}$ |
| +/- | $u_{s-1}$ | ++/- | $u_{s-3}$ |
| +/-- | $u_{s-2}$ | ++/-- | $u_{s-3}$ |

FIG. 4A — 401a

Positive Power

| P/Q | $u_k$ | P/Q | $u_k$ |
|---|---|---|---|
| +/+ | $u_{14}$ | ++/+ | $u_{16}$ |
| +/++ | $u_4$ | ++/++ | $u_{16}$ |
| +/- | $u_{13}$ | ++/- | $u_{17}$ |
| +/-- | $u_{18}$ | ++/-- | $u_{17}$ |

FIG. 4C — 401c

| P/Q demand | A 0:α3 | B α3:30 | C 30:α1 | D α1:60 |
|---|---|---|---|---|
| -/+ | $u_{m+1}$ | $u_{m+1}$ | $u_{b+1}$ | $u_{b+1}$ |
| -/++ | $u_{m+1}$ | $u_{b+1}$ | $u_{b+1}$ | $u_{b+1}$ |
| -/- | $u_{b-1}$ | $u_{b-1}$ | $u_{b-1}$ | $u_{m-1}$ |
| -/-- | $u_{b-1}$ | $u_{b-1}$ | $u_{b-1}$ | $u_{m-1}$ |

FIG. 4B — 401b

Negative Power

| P/Q | A | B | C | D |
|---|---|---|---|---|
| -/+ | $u_2$ | $u_2$ | $u_3$ | $u_3$ |
| -/++ | $u_2$ | $u_3$ | $u_3$ | $u_3$ |
| -/- | $u_1$ | $u_1$ | $u_2$ | $u_2$ |
| -/-- | $u_1$ | $u_1$ | $u_1$ | $u_2$ |

Operating a power converter coupled to an electric grid in a direct power control mode under substantially constant voltage conditions of a grid voltage and a dc link voltage of the power converter based at least in part on a switching table, the switching table including a set of space vector parameters associated with the dc link and grid voltages
510

↓

Detecting a grid fault voltage event in accordance with a measured change of the grid and dc link voltages relative to the substantially constant voltage conditions
520

↓

Determining a set of crossover angles for the Nearest Three Vectors related to voltage vector location inside space vector hexagonal disgram (N3V) based on measured grid and the dc link voltage.
530

↓

Dynamically adapting the switching table based on algorithmic feedforward of the set of crossover angles to the set of space vector parameters of the switching table
540

↓

Regulating the output power of the power converter in accordance with the dynamically adapted switching table
550

DYNAMIC DIRECT POWER CONTROL METHOD AND SYSTEM FOR A GRID CONNECTED CONVERTER

TECHNICAL FIELD

The disclosure herein relates to methods and systems for controlling power converters operatively coupled to an electrical grid.

BACKGROUND

Grid connected converters became the most critical power electronics application for interfacing Renewable Energy Resources (RES) to existing grids, transferring power through DC links (HVDC), and motor drive applications. The demand for fast and accurate power control became a dominant factor for designing the power converters. Moreover, the power converters should be controlled to perform efficiently under abnormal condition of the grid. Direct Power Control (DPC) method for controlling such converters has gained much attention due to its superior feature of fast dynamic response. However, conventional DPC method depends on using a static switching table to produce the required switching signals to the converter regardless of the grid and the dc link variations. The conventional DPC with a static switching table cannot perform efficiently under abnormal grid conditions such as voltage dips, frequency change, phase jump etc or dc link variation. With a sever condition of voltage dip or dc link voltage variation, the conventional DPC could fail to achieve the power demands hence, it will be interrupted or disconnected from the grid which is not acceptable for many applications. A method for adapting the conventional DPC under the abnormal grid operation became a serious topic which needs to be resolved for the DPC method to gain trust for those critical applications.

DETAILED DESCRIPTION

Among other benefits and advantages of the proposed dynamic direct power control (DDPC) technique and system of the disclosure herein, in recognizing that conventional static switching tables are typically designed presuming nominal or constant voltages of the grid and the dc link, the disclosure herein provides a novel dynamic switching table for the DPC. The dynamic switching table is based at least in part on actual variation in grid and dc-link voltages for operational control of a grid-connected power converter, such as due to a sudden or unexpected grid faults or heavy loading, where the grid voltage and the dc-link voltage may be subjected to considerable changes, especially in case of weak grids. The proposed dynamic switching table incorporates a new definition of power influence crossover angles of each space vector of the power converter hence, an advantageous and novel classification for space vectors sectors is introduced. The proposed scheme dynamically adapts the switching table to select the optimum space vector by feeding forward the actual grid and dc-link voltages, advantageously resulting in more precise control of power converter output. The proposed technique and system may be applied in various grid connected converter applications, including but not limited to grid-connected converters in back-to-back configuration for motor drive systems, grid-connected converters for wind turbine applications, and grid-connected sending and receiving converters for HVAC application, among others.

Provided is a method of controlling a power converter operatively coupled with an electric grid. The method comprises operating the power converter in a direct power control mode under substantially constant voltage conditions of a grid voltage of the electric grid and a dc link voltage of the power converter based at least in part on a switching table, the switching table including a set of space vector parameters associated with the dc link and grid voltages, detecting a grid fault voltage event in accordance with a measured change of the grid and dc link voltages relative to nominal operating voltage conditions, determining a set of crossover angles for the Nearest Three Vectors related to voltage vector location inside space vector hexagonal diagram (N3V) based on measured grid and the dc link voltages, dynamically adapting the switching table based on algorithmic feedforward of the set of crossover angles to the set of space vector parameters of the switching table, and regulating an output power of the power converter in accordance with the dynamically adapted switching table.

Also provided is a power converter control module coupled to an electric grid. The power converter control module includes a processor, and a memory storing instructions. The instructions are executable in the processor to operate the power converter in a direct power control mode under substantially constant voltage conditions of a grid voltage of the electric grid and a dc link voltage of the power converter based at least in part on a switching table, the switching table including a set of space vector parameters associated with the dc link and grid voltages, detect a grid fault voltage event in accordance with a measured change of the grid and dc link voltages relative to nominal operating voltage conditions, determine a set of crossover angles for the Nearest Three Vectors related to voltage vector location inside space vector hexagonal diagram (N3V) based on measured grid and the dc link voltages, dynamically adapt the switching table based on algorithmic feedforward of the set of crossover angles to the set of space vector parameters of the switching table, and regulate an output power of the power converter in accordance with the dynamically adapted switching table.

Further provided is a non-transitory computer readable memory storing instructions. The instructions are executable in a processor to operate a power converter that is operatively coupled in a direct power control mode under nominal operating conditions of a grid voltage of the electric grid and a dc link voltage of the power converter based at least in part on a switching table, the switching table including a set of space vector parameters associated with the dc link and grid voltages, detect a grid fault voltage event in accordance with a measured change of the grid and dc link voltages relative to the substantially constant voltage conditions, determine a set of crossover angles for the Nearest Three Vectors related to voltage vector location inside space vector hexagonal diagram (N3V) based on measured grid and the dc link voltages, dynamically adapt the switching table based on algorithmic feedforward of the set of crossover angles to the set of space vector parameters of the switching table, and regulate output power of the power converter in accordance with the dynamically adapted switching table.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include one or more processors and various forms of memory for storing data and processor-executable instructions. Embodiments described herein may be implemented in the form of computer processor-executable logic instructions or programs stored on computer memory mediums.

Figure 1:
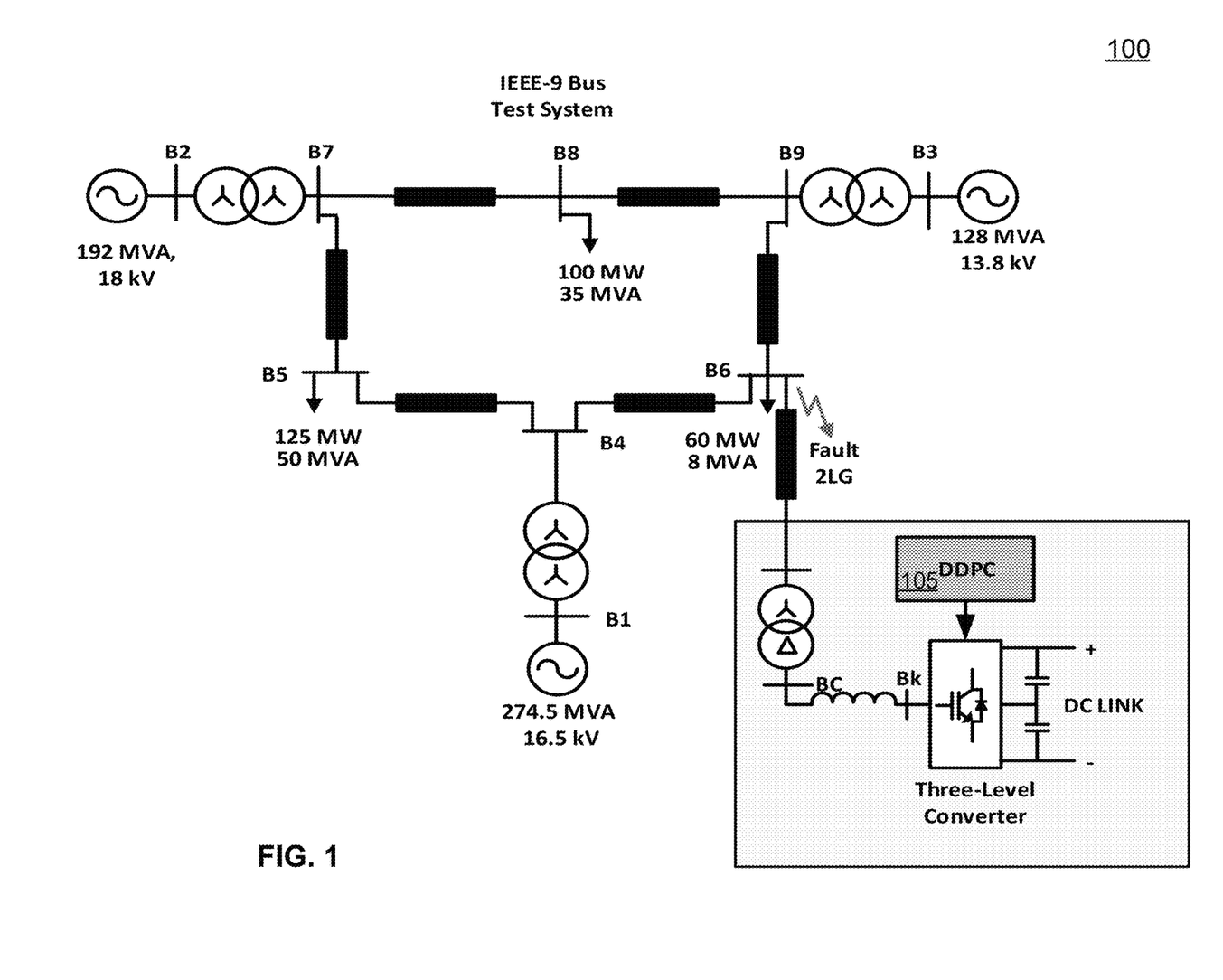
FIG. 1 illustrates an example embodiment of a grid connected power converter controlled by the proposed Dynamic Direct Power Control (DDPC) method.

FIG. 1 illustrates, in an example embodiment configured as test and simulation system 100, a grid-connected power converter electrically connected within an electrical grid. The DC link may be a capacitor device in one embodiment, electrically interposed between the power converter and other power electronic application. The power converter may be electrically controlled via dynamic direct power control (DDPC) module 105. Dynamic direct power control module 105 may include any combination of hardware elements, electrical circuitry and encoded software instructions, in one example embodiment, a processor and a non-transient memory storing instructions executable in the processor to control functioning and response of the power converter within the electrical grid. In one embodiment, dynamic direct power control module 105 may include capability for operating the power converter based on a dynamic adapted switching table in response to variations in grid and dc link voltages.

Figure 2A:
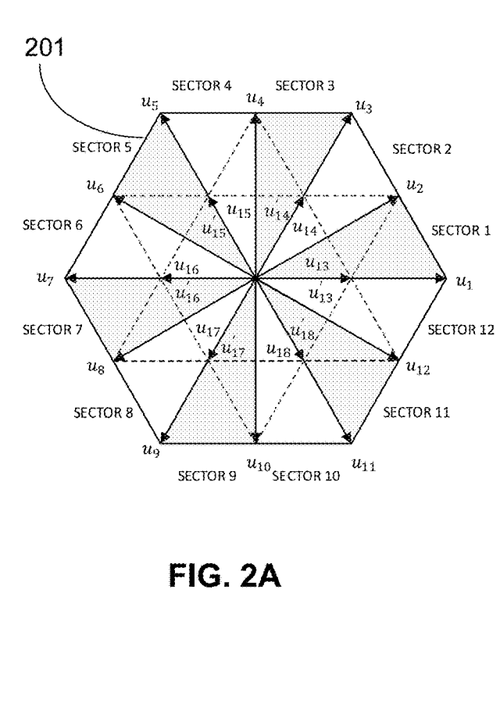
FIG. 2A illustrates, in an example embodiment, Three-Level Converter Space Vectors.

FIG. 2A illustrates, in an example embodiment 201, Three-Level Converter Space Vectors.

Figure 2B:
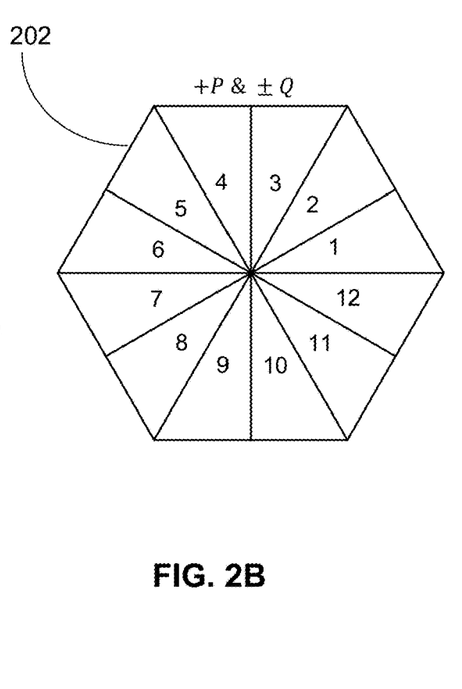
FIG. 2B illustrates, in an example embodiment, 12-Sectors classification of the Conventional Three-Level Converter Space Vectors which is used also for regulating the positive power demand only as well as the reactive power.

FIG. 2B illustrates, in an example embodiment, 12-Sectors classification of the Conventional Three-Level Converter Space Vectors of FIG. 2A, hexagonal diagram 202 divided into 12 sectors representing space vectors which increase the active power output.

Figure 2C:
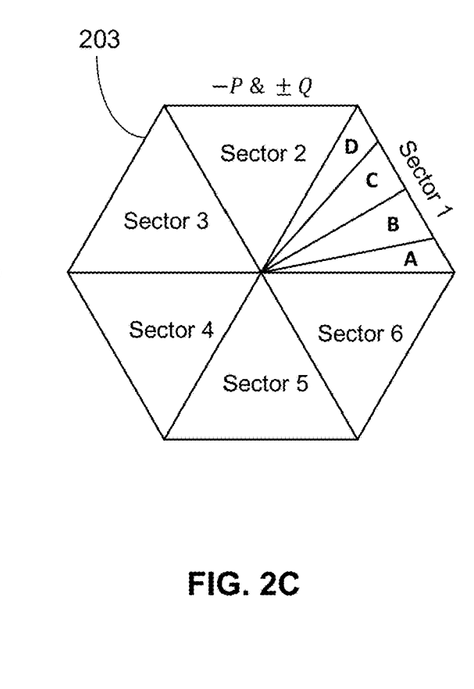
FIG. 2C illustrates an example embodiment of a proposed Six-Sectors with a dynamic 4-subsectors classification of the Three-Level Converter Space Vectors designed for the proposed Dynamic Direct Power Control (DDPC) Method.

FIG. 2C illustrates an example embodiment of a proposed Six-Sectors with a dynamic 4-subsectors classification of the Three-Level Converter Space Vectors designed for the proposed Dynamic Direct Power Control (DDPC) method (DDPC), with the active power decrease influence vectors divided into 6 sectors, each sector of hexagon 203 being sub-divided into 4 regions The conventional DPC method directly selects the optimum converter vectors that increase or decrease the active and reactive power from a static switching table. The optimum converter vectors are selected by well-defined rules triggered from hysteresis comparators, which use the instantaneous measured values of active and reactive power without introducing any filtering stage. With reference to FIG. 2A, the conventional DPC controller selects the appropriate vector $u_k$ at each sampling frequency to regulate the converter power as well as the dc-link voltage. The relationship between the converter vector, grid vector and the rate of converter's power change may be expressed as:

$$\begin{cases} \dfrac{dP}{dt} = \dfrac{1.5}{L_g}[u_{gd}^2 - u_{gd}u_k \cos(\theta_g - \theta_k)] \\ \dfrac{dQ}{dt} = \dfrac{1.5}{L_g} u_{gd}u_k \sin(\theta_g - \theta_k) \end{cases}$$

where $L_g$ is the equivalent upstream inductance, $u_{gd}$ is the d-axis component of grid voltage vector, $u_k$ is the converter voltage vector, and '$\theta_g$-$\theta_k$' is the relative angle between grid vector angle $\theta_g$ and converter voltage vector angle $\theta_k$ which can be defined in relation to the space vector diagram shown in FIG. 2A.

As referred to herein, the crossover angles in one embodiment may be derived assuming that the grid and the dc-link voltages are dynamically changing. The converter space vectors can be presented by dc-link voltage as follows:

$$u_k = A_k u_{dc.act} \angle \theta_k$$

where $u_{dc.act}$ is the actual dc-link voltage, $\theta_k$ is the converter space vector '$u_k$' angle, and $A_k$ is the converter space vector amplitude coefficient which equals to ⅓ for small vectors ($u_{13}$, $u_{14}$, $u_{15}$, $u_{16}$, $u_{17}$ and $u_{18}$), $$\dfrac{1}{\sqrt{3}}$$

for medium vectors ($u_2$, $u_4$, $u_6$, $u_8$, $u_{10}$ and $u_{12}$) and ⅔ for big vectors ($u_1$, $u_3$, $u_5$, $u_7$, $u_9$ and $u_{11}$). The actual dc-link voltage can be expressed using the nominal value as:

$$u_{dc.act} = k_{dc} u_{dc.nom}.$$

The setup minimum value of the dc-link voltage boost is commonly selected more than $\sqrt{2}$ times the converter's line-to-line voltage. Moreover, the dc-link setup voltage should be further boosted by a $k_{boost}$ factor to compensate for the voltage drop across the upstream equivalent inductance. Thus, the nominal setup of the dc-link voltage can be expressed as:

$$u_{dc.nominal} = k_{boost} \cdot k_{dc} \sqrt{2} \cdot V_{line.RMS}.$$

The converter terminal voltage vector amplitude in this case can be expressed as:

$$|u_k| = \sqrt{2} A_k k_{boost} \cdot k_{dc} \sqrt{2} \cdot V_{line.RMS}.$$

The converter terminal voltage may be expressed by the positive sequence component of the grid voltage, $u_{gd}$ under balanced three phase system as:

$$|u_{gd}| = \frac{\sqrt{2}}{\sqrt{3}} V_{line.RMS}.$$

Accordingly, the converter terminal vector may be expressed as:

$$u_k = \sqrt{3} A_k k_{boost} k_{dc} u_{gd.nom} \angle \theta_k$$

The actual grid voltage may be represented using a variation factor $k_v$ as:

$$|u_{gd}| = k_v \cdot u_{gd.nom}.$$

The converter voltage magnitude may be represented based on the latter relations as:

$$|u_k| = \sqrt{3} A_k k_{boost} \frac{k_{dc}}{k_v} |u_{gd}|$$

The converter delivered power rate of change in the dynamic case under dc link and grid voltage variation may be expressed in terms of the dc-link and the grid voltages as:

$$\begin{cases} \frac{dP}{dt} = \frac{3u_{gd}^2}{2L_g} \left[ 1 - \frac{\sqrt{3} A_k k_{boost} k_{dc}}{k_v} \cos(\theta_g - \theta_k) \right] \\ \frac{dQ}{dt} = \frac{3u_{gd}^2}{2L_g} \left[ \frac{\sqrt{3} A_k k_{boost} k_{dc}}{k_v} \cos(\theta_g - \theta_k) \right] \end{cases}$$

The crossover angles of any vector $u_k$ can be obtained by setting the power rate of change of above equations to zero as referred to herein may be defined by setting $$\frac{dP}{dt} = 0$$

and $$\frac{dQ}{dt} = 0$$

and as:

$$\begin{cases} \theta_{P.cross} = \theta_k + \cos^{-1} \frac{k_v}{\sqrt{3} A_k k_{boost} k_{dc}} \\ \theta_{Q.cross} = \theta_k \end{cases}$$

The latter relation indicates that the crossover angle of the converters space vectors for reactive power producing is exactly equal to the converter space vector angle itself which means that there is no any crossover angles within each hexagonal 12 sectors. Accordingly, the hexagonal diagram in accordance with FIG. 2A may be divided similar to the conventional DPC scheme into 12 sectors so that the reactive power influence curves cross the x-axis exactly at sectors' borders. On the contrary, the crossover angle of the active power influence vectors takes place inside each sector. As illustrated before through equations, the crossover angles of each vector change dynamically with the actual value of the dc-link and grid voltages.

The influence of each vector on active and reactive power may be represented using the power rate of change as expressed above based on dc link and grid voltages. The converter space vectors' influence on active and reactive power in relation with the actual grid voltage vector location and amplitude can be classified into two groups: a first group of converters space vectors which increase the active power, and a second group of converters space vectors which decrease the reactive power. Usually, the converter space vectors are graphically presented in the hexagonal diagram which is divided into 12 sectors 201 as shown in FIG. 2A. The influence of each converter space vector is calculated using the power rate of change expression above, assuming nominal grid and dc-link voltages with 1.3 boost factor, in one embodiment.

Figure 3A:
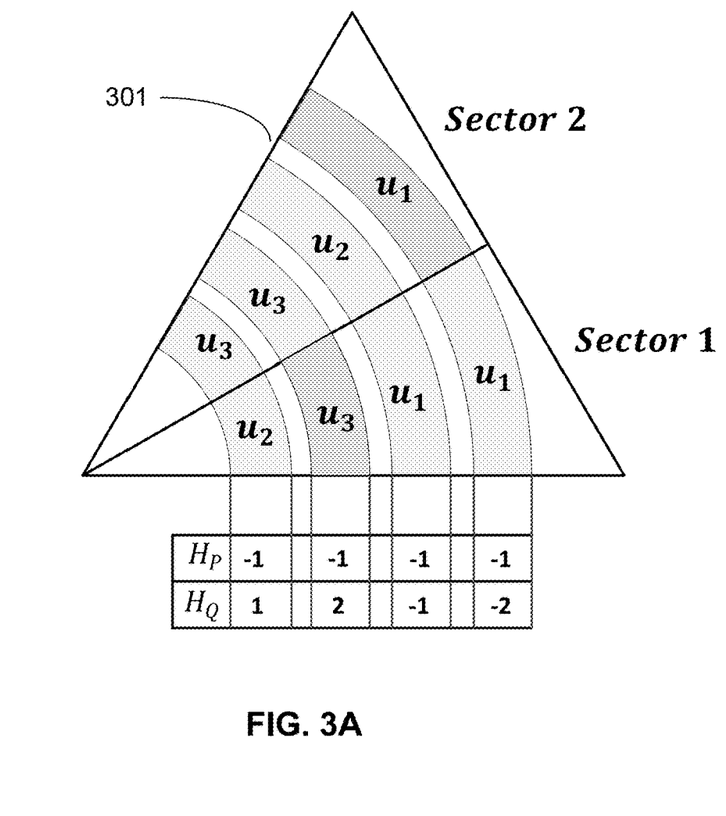
FIG. 3A illustrates example embodiment representations of sector associations with the selected space vectors for conventional DPC method.

FIG. 3A illustrate example embodiment representations of sectors 1 and 2 in a 12 sector space vector hexagonal presentation associations with related in space vectors transition, It is clear from FIG. 3A that the conventional method alter the converter space vectors based on the power hysterics comparators (static switching table) once the grid vector cross the sector boarder regardless of the value of dc link voltage or grid vector voltage amplitude.

Figure 3B:
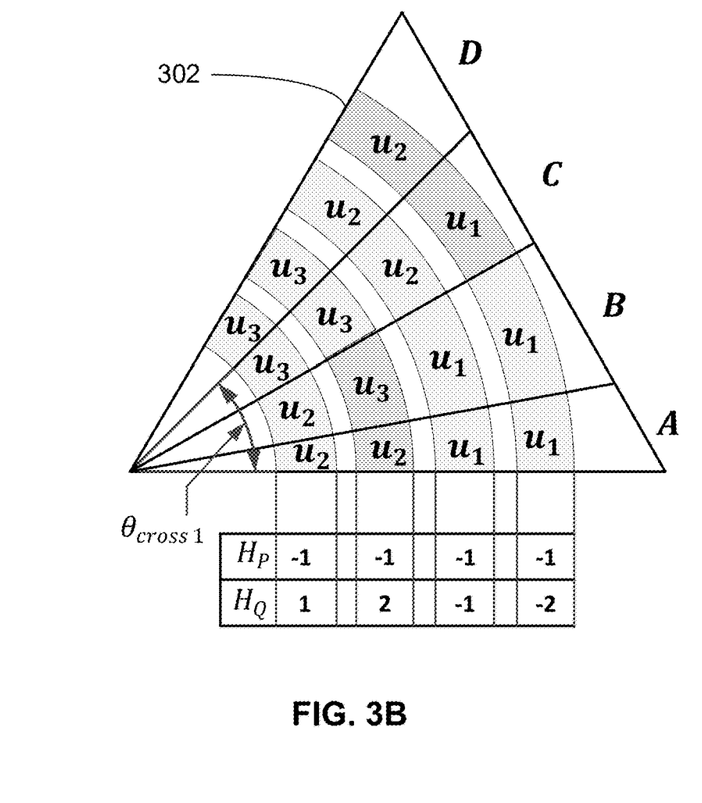
FIG. 3B illustrates an example of embodiment representation of the proposed sector associations with the new selected space vectors based on a crossover angle method as defined herein.

FIG. 3B illustrates the subdivided Sectors A, B, C, and D in the proposed 6 sector space vectors hexagonal presentation associations with related in space vectors transition, in relation to a crossover angle as defined herein 302. in relation to a crossover angle as defined herein 301. The crossover angles $\alpha_k$ for each converter space vector ($u_k$) can be calculated using the actual measured grid and dc-link voltages by setting $$\frac{dP}{dQ} = 0,$$

as follows:

$$\alpha_k = \theta_k \pm \cos^{-1} \left( \frac{u_{gd}}{u_k} \right)$$

where $\theta_k$ is the converter space vector angle.

FIGS. 3A and 3B can be discussed in details as follows: the active power decreasing demand ($H_P = -1$) and reactive power high increasing demand ($H_Q$=2), the standard sectors shown in FIG. 3A utilizes only vector $u_3$ for sectors 1 and sector 2, while the proposed subsectors shown in FIG. 3B utilizes vector $u_2$ in subsector A and once the grid vector cross the calculated cross angle of vector $u_3$ ($\theta_{cross3}$), the converter space vector $u_3$ changes its affinity from decreasing the active power (subsector A) to increasing the active power (subsector B). Similarly, as shown for converter space vectors $u_1$ and $u_2$ when the power demands is presented by ($H_P$=−1, $H_Q$=−2). Based on the proposed crossover angles concept as defined herein, the DDPC controller takes action to change the converter applied space vector from $u_2$ to $u_3$ immediately when the grid vector cross sub-sector A.

Figure 4A:
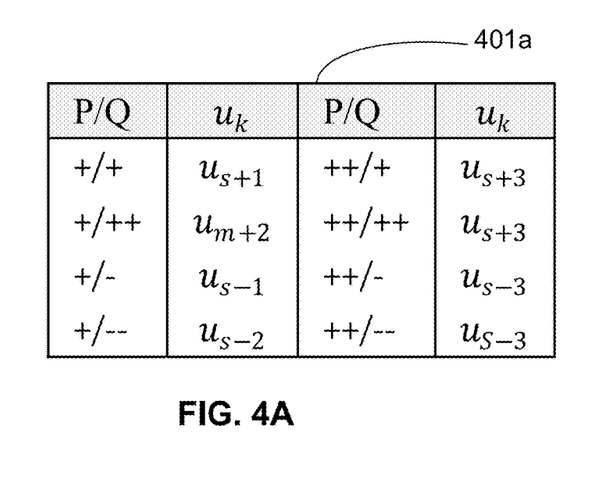
FIG. 4A and FIG. 4B illustrate, in example embodiments, the new generic switching table representations for positive and negative power demands for various sectors of the power converter space vectors.
Figure 4B:
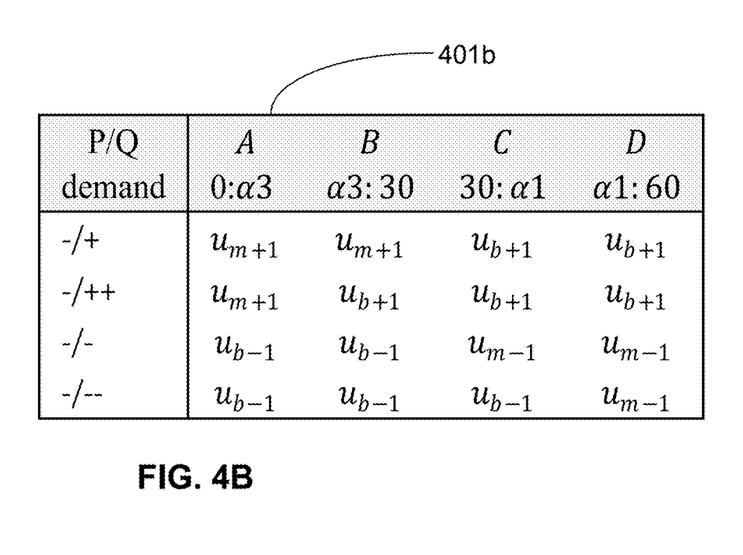

FIG. 4A and FIG. 4B illustrate, in example embodiments 401a, 401b respectively, the new generic switching table representations for positive and negative power demands for various sectors of the power converter space vector. In details, the converter space vector are classified into three categories, Big Vectors $u_b$, Medium Vectors $u_m$ and Small Vectors $u_s$. To construct the switching table in any sector, knowing the position of the grid voltage vector in that sector, the table in 401a and 401b can be used. For example referring to 401a, if it is required to slightly increase the active power P(+) and slightly increase the reactive power Q(+), the "NEXT Small Vector" $u_{s+1}$ should be used based on the actual converter space vectors located in that specific sector. In this example referring to FIG. 2A and Sector 1, if the grid voltage vector is located in sector 1, the next converter space vector that will achieve the above power demands is $u_{14}$. Similarly, the switching table for sector no. 5 selects the next Small Vector $u_{16}$, and so,.

Figure 4C:
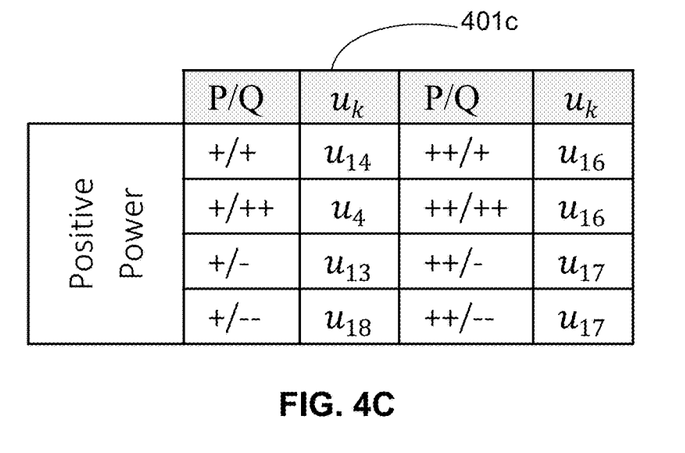
FIG. 4C and FIG. 4D illustrate, in example embodiments, the new generic switching table implementation for sector number 1.
Figure 4D:
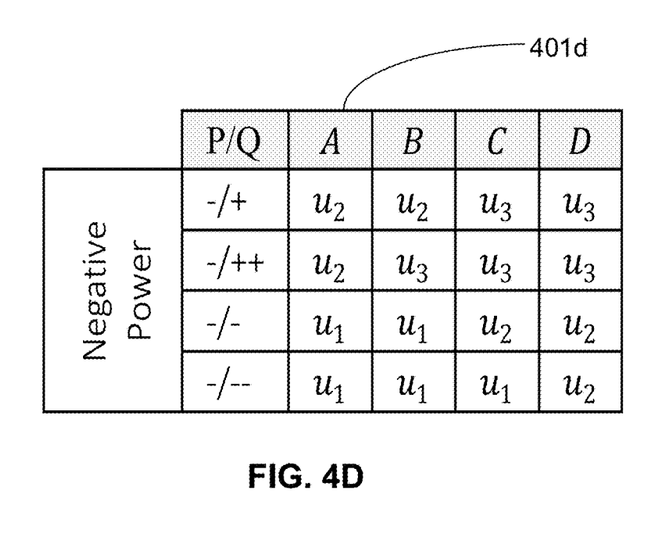

FIG. 4C and FIG. 4D illustrate, in example embodiments 401c, 401d respectively, the new generic switching table implementation for sector number 1. By completing all sectors, the entire switching tables can be constructed. However, the generic method is a smart programmatical way to reduce the effort of constructing the entire table manually and also it saves the processor memory space. In addition to, the proposed method is dynamically created the switching table as the crossover angles always varies.

The crossover angles may be dynamically calculated and algorithmically feedforwarded to the switching table. The online crossover angles can be calculated, in an embodiment, using the relation as described above:

$$\theta_{cross} = \theta_k \pm \cos^{-1}\left(\frac{u_{gd}}{A_k u_{dc\text{-}act}}\right)$$

By the dynamic calculation of the crossover angles, the static switching table is adapted or transformed into a dynamic switching table which increases accuracy of the DDPC and prevents the cyclic pulsation of active and reactive power outputs of the power converter during the transients as well as the steady-state operation.

FIGS. 4C and 4D represent the static switching table 401c, 401d based upon which the dynamically switched tables 401a, 401b of FIG. 4A and FIG. 4B may be generated based on algorithmic feedforward of crossover angles. The influence magnitude of converter space vectors which increase the active power may be denoted by '+' for small increments, '+ +' for medium increments and '+ + +' for big increments. Similarly, '−' for small decrements, − −2 for medium decrements and '− − −' for big decrements.

Figure 5:
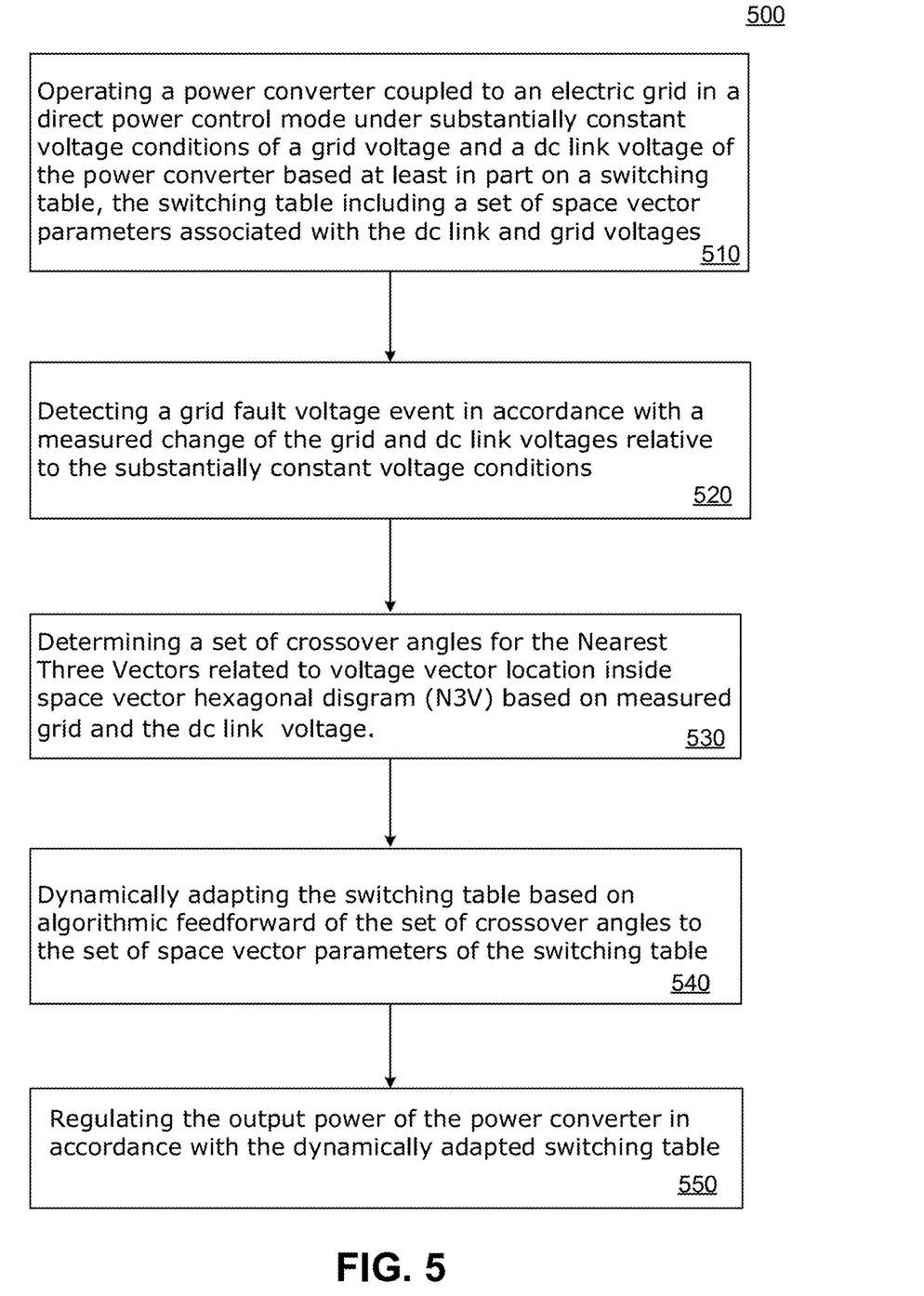
FIG. 5 illustrates, in an example embodiment, a method of operation in implementing dynamic direct power control.

FIG. 5 illustrates, in an example embodiment, method 500 of operation 500 of dynamic direct power control module 105. In describing the example of FIG. 5, reference is made to the examples of FIGS. 1-4 collectively for purposes of illustrating suitable components or elements for performing a step or sub-step being described.

At step 510, operating the power converter 101 in a direct power control mode under substantially constant voltage conditions of a grid voltage of the electric grid 102 and a dc link voltage of the power converter based at least in part on a switching table, the switching table including a set of vector space parameters associated with the dc link and grid voltages.

At step 520, detecting a grid fault voltage event in accordance with a measured change of the grid and dc link voltages relative to the substantially constant voltage conditions.

In one embodiment, a grid fault voltage event, or an unexpected heavy loading fluctuation, may be detected by evaluating the positive or the negative sequence component of the grid voltage vector in the synchronous reference frame (dq-axis) to determining whether that dq-axis value of the grid voltage exceeds a threshold limit.

At step 530, determining a set of crossover angles for the Nearest Three Vectors related to voltage vector location inside space vector hexagonal diagram (N3V) based on measured grid and the dc link voltages. The set of crossover angles is determined for a set of power converter space vectors to construct the dynamic switching table. The set of crossover angles, in one embodiment, is determined for a set of power converter space vectors based on dynamically constructing the switching table and selecting the optimum converter space vector based at least on the present location of the grid vector inside the hexagonal space vector diagram.

At step 540, dynamically adapting the switching table based on algorithmic feedforward of the set of crossover angles to the set of converter space vectors.

In one embodiment, the method further comprises a hybrid Hexagonal Space Vectors including a first Hexagonal Space Vector diagram classified into 6 sectors and 4 subsectors, and a second Hexagonal Space Vector diagram classified into 12 sectors based on the calculated set of the crossover angles, wherein the first Hexagonal Space Vector diagram is used to generate the optimum converter space vector for producing the negative active power ($P^-$), and the second Hexagonal Space Vector diagram is used to generate the optimum converter space vector for producing the positive active power ($P^+$) as well as producing both the positive and negative reactive power ($Q^+$) and ($Q^-$).

At step 550, regulating output power of the power converter in accordance with the dynamically adapted switching table.

In one embodiment, regulating the output power includes regulating one or both of the active power output and the reactive power output. The converter is controlled by the dynamic switching table to eliminate, or at least minimize, any undesirable cyclic pulsation in the active and reactive power components.

In other embodiments, the method steps described may be embodied as processor-executable instructions stored in a non-transitory storage medium or memory and incorporated into, or made communicatively accessible to, any one or more of an electrical grid controller device, a power converter controller device, a terminal computing device or a server computing device.

It is contemplated for embodiments described herein to extend to individual elements and concepts described herein, independently of other concepts, ideas or system, and also for the embodiments to include combinations of elements recited throughout this application. Although embodiments are described in detail herein with reference to the accompanying drawings, it is contemplated that the invention is not limited to such embodiments. As such, many modifications and variations will be apparent to practitioners skilled in this art.

Figure 6A:
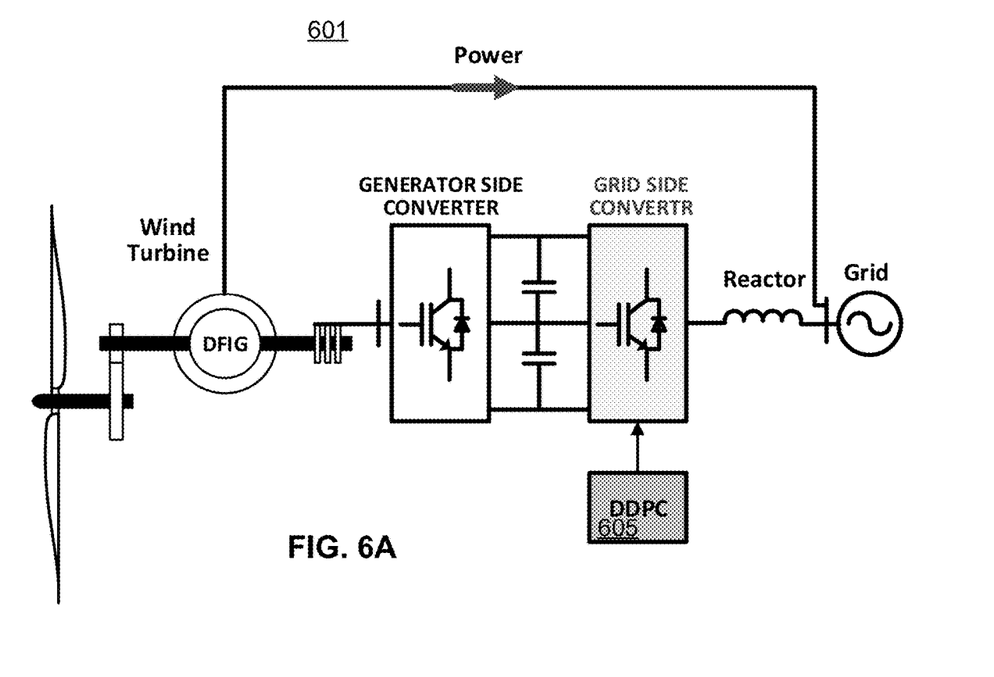
FIG. 6A illustrates an example application case of the invention herein to a grid-connected converter for a wind turbine system.
Figure 6B:
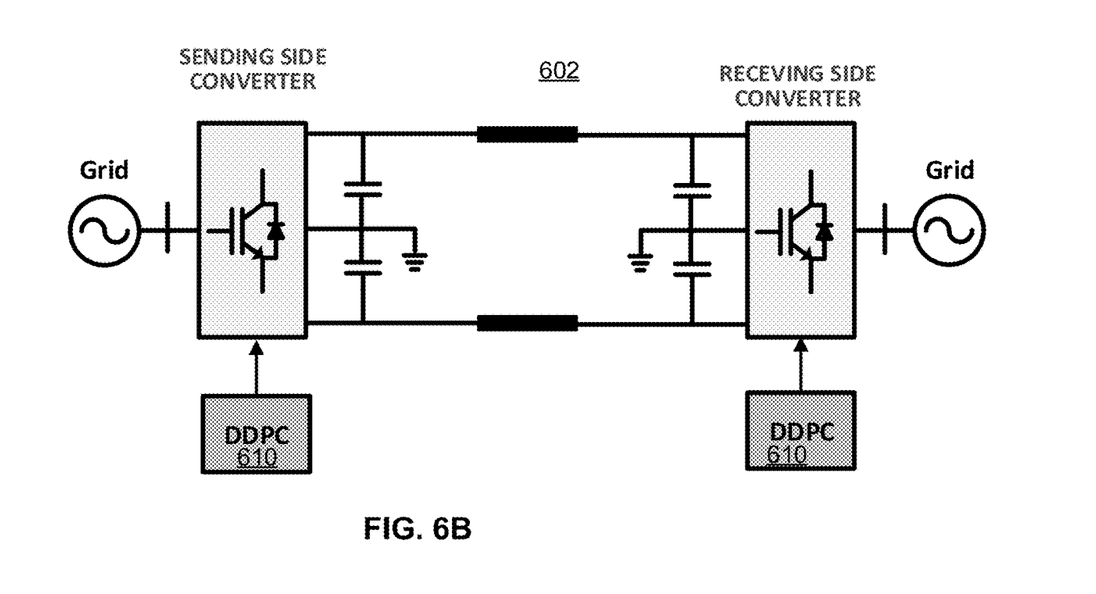
FIG. 6B illustrates a further example application case of the invention herein to a grid-connected converter for a high voltage direct current (HVDC) system.
Figure 6C:
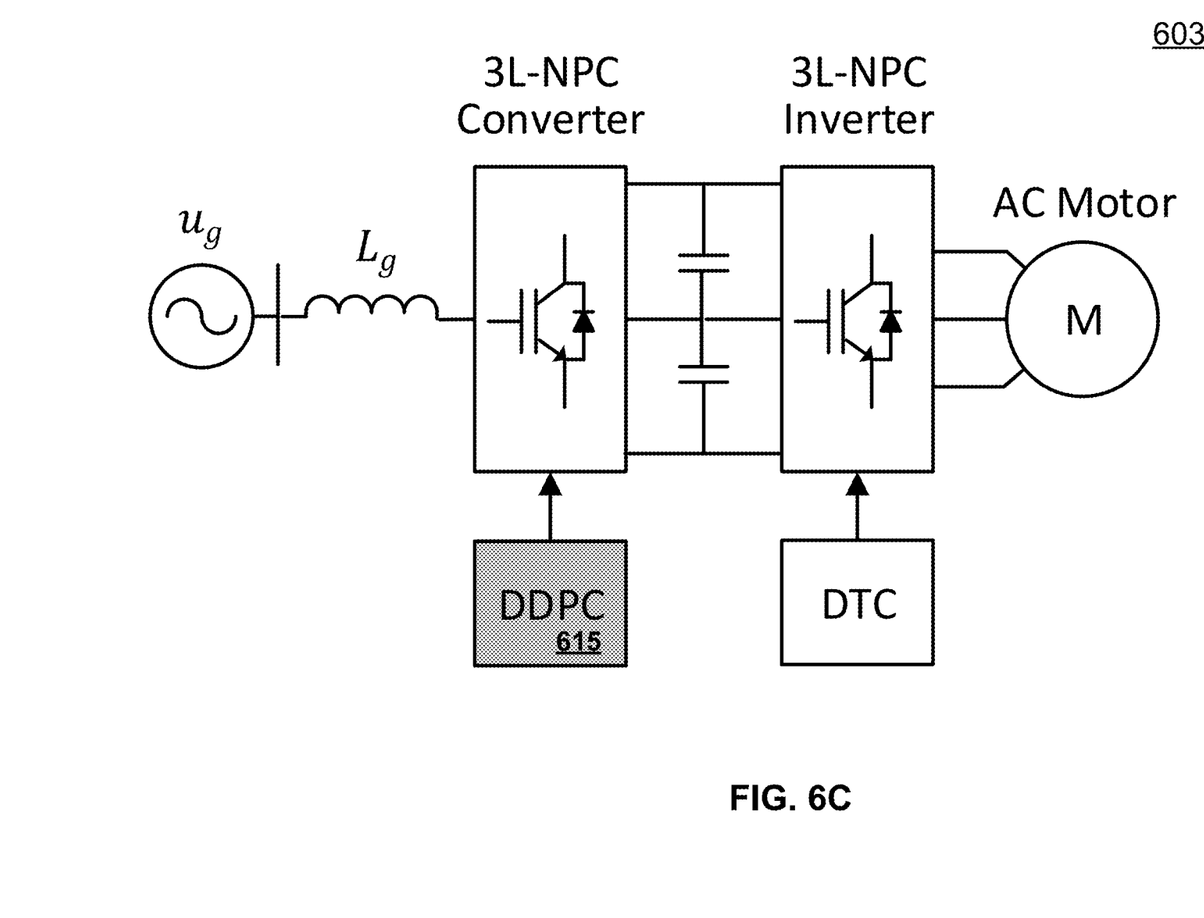
FIG. 6C illustrates a further example application case of the invention herein to a grid-connected converter for a medium voltage motors drive application.

For instance, and by way of illustration of additional examples of applying the dynamic direct power control methods and systems disclosed herein, FIG. 6A illustrates an example application case of the invention herein that implements dynamic direct power control module 605 to grid-connected converter for wind turbine system 601. FIG. 6B illustrates a further example application case of the invention herein that implements dynamic direct power control module 610 to a grid-connected converter for high voltage direct current (HVDC) system 602. FIG. 6C illustrates a further example application case of the invention herein that implements dynamic direct power control module 615 to a grid-connected converter for a medium voltage motors drive application 603.

Figure 7A:
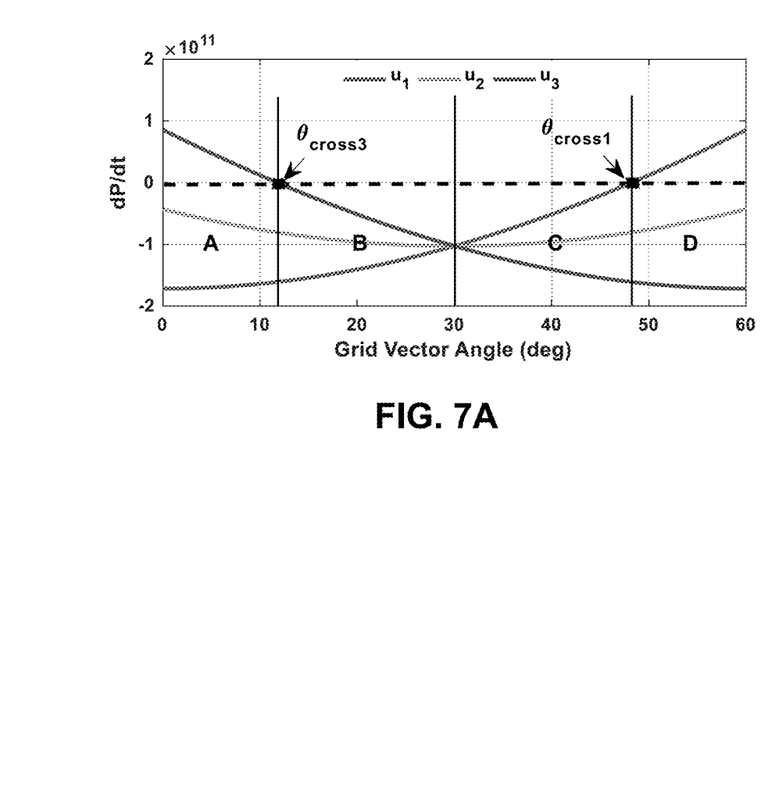
FIG. 7A illustrates an example of embodiment representation for the affinity of the power converter sector no. 1 Nearest Three Vectors (N3V) to alter the active power and related crossover angles with respect to grid voltage vector location.

FIG. 7A illustrates an example of embodiment representation for the affinity of the power converter sector no. 1 Nearest Three Vectors to alter the active power and related crossover angles with respect to grid voltage vector location.

Figure 7B:
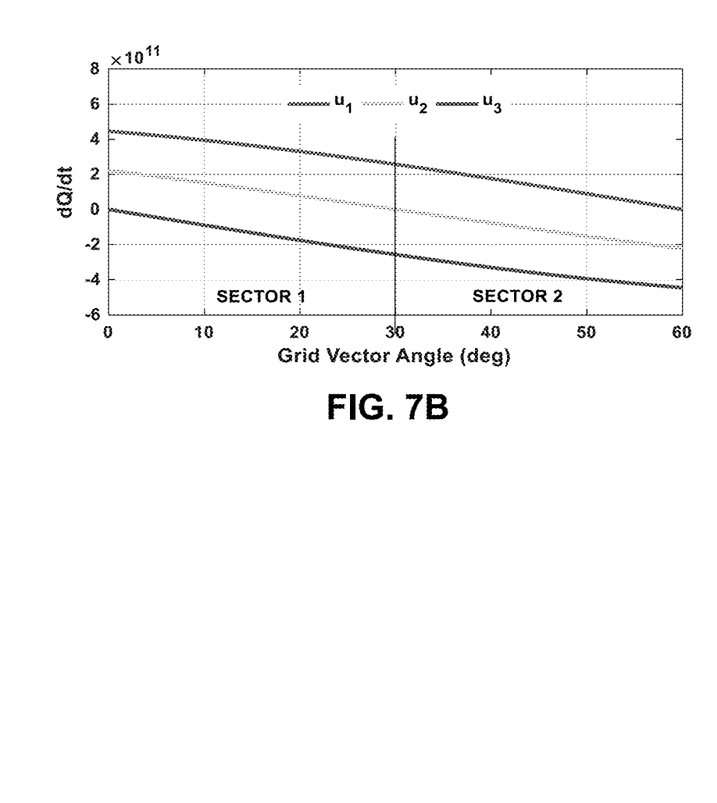
FIG. 7B illustrates an example of embodiment representation for the affinity of the power converter sector no. 1 Nearest Three Vectors to alter the reactive power with respect to grid voltage vector location.

FIG. 7B illustrates an example of embodiment representation for the affinity of the power converter sector no. 1 Nearest Three Vectors to alter the reactive power with respect to grid voltage vector location.

Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, any absence of describing combinations should not preclude the inventors from claiming rights to such combinations.

What is claimed is:

1. A method of controlling a power converter operatively coupled with an electric grid, the method comprising:
   operating the power converter in a direct power control mode with a dynamic switching table under nominal and abnormal operating voltage conditions of a grid voltage of the electric grid and a dc-link voltage of the power converter, the dynamic switching table including a group of converter space vectors and switching rules associated with the grid voltage and the dc-link voltage of the power converter;
   detecting abnormalities in the grid voltage and/or the dc-link voltage of the power converter due to a grid fault event relative to the nominal operating voltage conditions;
   determining a group of crossover angles for a group of converter vectors including the nearest three vectors to a grid voltage vector location inside a hexagonal space vector diagram;
   dynamically selecting a proper vector based on algorithmic feedforward of the group of crossover angles to dynamically construct the dynamic switching table; and
   controlling an output power of the power converter.

2. The method of claim 1 wherein the power converter is operatively coupled to the electric grid within one of a motor drive application, a grid side wind energy conversion application, and at least one of a sending side and a receiving side of a high voltage direct current (HVDC) application.

3. The method of claim 1 wherein the group of crossover angles is determined online for selecting a group of power converter space vectors based on dynamically constructing the dynamic switching table and selecting a proper converter space vector based at least on active and reactive power demand and a present location of the grid voltage vector (voltage vector angle) inside the hexagonal space vector diagram.

4. The method of claim 1 further comprising constructing a multi hexagonal space vectors diagram including a first hexagonal space vector diagram classified into 6 sectors and 4 subsectors, and a second hexagonal space vector diagram classified into 12 sectors, the first hexagonal space vector diagram constructed based on an online calculation of crossover angles for each vector in each sector, wherein the first hexagonal space vector diagram is used to generate the proper converter space vector for reducing an active power ($P^-$) when requested by a hysteresis active power comparator, and the second hexagonal space vector diagram is used to generate the proper converter space vector for increasing the active power ($P^+$) as well as increasing or decreasing reactive power ($Q^+$) and ($Q^-$) when requested by the hysteresis active power comparator and a hysteresis reactive power comparator.

5. The method of claim 4 wherein the controlling the output power includes one of eliminating and minimizing an undesired cyclic pulsation response of the active power and the reactive power.

6. A power converter control module operatively coupled to an electrical grid, the power converter control module comprising:
   a processor;
   a memory storing instructions executable in the processor to:
      operate a power converter in a direct power control mode under nominal and abnormal operating voltage conditions of a grid voltage of an electric grid and a dc-link voltage of the power converter based at least in part on a switching table, the switching table including a group of converter space vectors and switching rules associated with the grid voltage and the dc-link voltage of the power converter;
      detect a grid fault event in accordance with a measured change of grid direct and quadrature components of a grid voltage vector and magnitude of the dc-link voltage of the power converter relative to the nominal operating voltage conditions;
      determine a group of crossover angles for a group of the nearest three vectors related to a grid voltage vector location inside a hexagonal space vector diagram based on online measurement of the grid voltage vector and the dc-link voltage amplitude;
      dynamically select a proper vector based on algorithmic feedforward of the group of crossover angles to dynamically construct the switching table; and
      control an output power of the power converter.

7. The power converter control module of claim 6 wherein the power converter is operative coupled to the electric grid within one of a motor drive application, a grid side wind energy conversion application, and at least one of a sending side and a receiving side of a high voltage direct current (HVDC) application.

8. The power converter control module of claim 6 wherein the group of crossover angles is determined online for selecting the group of converter space vectors based on dynamically constructing the switching table and selecting a proper converter space vector based at least on active and reactive power demand and a present location of the grid voltage vector (voltage vector angle) inside the hexagonal space vector diagram.

9. The power converter control module of claim 6 further comprising a multi hexagonal space vectors diagram including a first hexagonal space vector diagram classified into 6 sectors and 4 subsectors, and a second hexagonal space vector diagram classified into 12 sectors, the first hexagonal space vector diagram being constructed based on an online calculation of crossover angles for each vector in each sector, wherein the first hexagonal space vector diagram is used to generate the proper converter space vector for reducing an active power ($P^-$) when requested by a hysteresis active power comparator, and the second hexagonal space vector diagram is used to generate the proper converter space vector for increasing the active power ($P^+$) when requested by the hysteresis active power comparator as well as increasing or decreasing a reactive power ($Q^+$) and ($Q^-$) when requested by a hysteresis reactive power comparator.

10. The power converter control module of claim 9 wherein controlling the output power of the converter includes one of eliminating and minimizing an undesired cyclic pulsation response in the active power and the reactive power.

11. A non-transitory computer readable memory storing instructions, the instructions executable in a processor to:
operate a power converter in a direct power control mode under nominal and abnormal operating voltage conditions of a grid voltage of an electric grid and a dc-link voltage of the power converter based at least in part on a switching table, the switching table including a group of converter space vectors and a group of rules associated with the grid voltage and the dc-link voltage of the power converter, and actual active and reactive power measurements;
detect a grid fault event in accordance with a measured change of grid direct and quadrature components of a grid voltage vector and a magnitude of the dc-link voltage relative to the nominal operating voltage conditions;
determine a group of crossover angles for a group of the nearest three vectors related to grid voltage vector location inside a hexagonal space vector diagram based on an online measurement of the grid voltage vector and a dc-link voltage amplitude;;
dynamically select a proper vector based on algorithmic feedforward of the group of crossover angles to dynamically construct the switching table; and
control an output voltage of the power converter.

12. The non-transitory computer readable memory of claim 11 wherein the power converter is operative coupled to the electric grid within one of a motor drive application, a grid side wind energy conversion application, and at least one of a sending side and a receiving side of a high voltage direct current (HVDC) application.

13. The non-transitory computer readable memory of claim 11 wherein the group of crossover angles is determined for a group of power converter space vectors based on dynamically constructing the switching table and selecting a proper converter space vector based at least on a present grid voltage vector location inside the hexagonal space vector diagram.

14. The non-transitory computer readable memory of claim 11 further comprising a multi hexagonal space vectors diagram including a first hexagonal space vector diagram classified into 6 sectors and 4 subsectors, and a second hexagonal space vector diagram classified into 12 sectors, the first hexagonal space vector diagram being constructed based on an online calculation of crossover angles for each vector in each sector, wherein the first hexagonal space vector diagram is used to generate the proper converter space vector for reducing an active power ($P^-$) when requested by a hysteresis active power comparator, and the second hexagonal space vector diagram is used to generate the proper converter space vector for increasing the active power ($P^+$), when requested by a hysteresis active power comparator as well as increasing or decreasing a reactive power, ($Q^+$) and ($Q^-$) when requested by the hysteresis reactive power comparator.

15. The non-transitory computer readable memory of claim 14 wherein controlling the output power of the converter includes one of eliminating and minimizing an undesired cyclic pulsation response in the active power and the reactive power.

* * * * *

UNITED STATES PATENT AND TRADEMARK OFFICE
CERTIFICATE OF CORRECTION

PATENT NO. : 10,637,243 B1
APPLICATION NO. : 16/251906
DATED : April 28, 2020
INVENTOR(S) : Ahmed et al.

Page 1 of 1

It is certified that error appears in the above-identified patent and that said Letters Patent is hereby corrected as shown below:

On the Title Page

Item (73),
Delete "Emirates Steel Industries PJSC, Musaffah, Abu Dahbi (AE)"
Insert --Emirates Steel Industries PJSC, Musaffah, Abu Dahbi (AE); Khalifa University of Science and Technology, Emirate of Abu Dahbi (AE)--

Signed and Sealed this
Tenth Day of November, 2020

Andrei Iancu
*Director of the United States Patent and Trademark Office*